United States Patent [19]

Maimets

[11] E Re. 30,929

[45] Reissued May 11, 1982

[54] COLLAPSIBLE TUNNEL LINER SECTION AND METHOD OF LINING A TUNNEL

[76] Inventor: Lembit Maimets, 39 Rivercourt Blvd., Toronto, Ontario, Canada, M4J 3A3

[21] Appl. No.: 188,424

[22] Filed: Sep. 18, 1980

Related U.S. Patent Documents

Reissue of:

[64] Patent No.: 4,124,985
Issued: Nov. 14, 1978
Appl. No.: 837,112
Filed: Sep. 28, 1977

[51] Int. Cl.[3] ..... E21D 5/00; E01G 5/16

[52] U.S. Cl. ..... 405/150; 405/289

[58] Field of Search ..... 405/132–152, 405/233; 425/59

[56] References Cited

U.S. PATENT DOCUMENTS

| | | | |
|---|---|---|---|
| 59,578 | 11/1866 | Follensbee | 425/59 X |
| 1,248,643 | 12/1917 | Furry | 405/132 |
| 1,792,084 | 2/1931 | Glasser | 405/148 |
| 1,843,334 | 2/1932 | McGrath | 405/150 |
| 2,144,013 | 1/1939 | Donaldson | 405/150 X |
| 2,148,783 | 2/1939 | Spaulding | 405/150 |
| 2,870,518 | 1/1959 | Bössner | 425/59 X |
| 3,206,824 | 9/1965 | Cerutti | 405/150 |
| 3,396,545 | 8/1968 | Lamberton | 405/233 |
| 3,750,407 | 8/1973 | Heierli et al. | 405/138 |
| 4,010,616 | 3/1977 | Lovat | 405/132 |

*Primary Examiner*—Dennis L. Taylor
*Attorney, Agent, or Firm*—Rogers, Bereskin & Parr

[57] ABSTRACT

A collapsible tunnel liner section formed from a number of arcuate segments each connected together by hinges to form a closed loop. In collapsed condition the segments are arranged in a compact stack having a cross section less in its maximum dimension than the internal diameter of the erected liner section. Typically the stack has the appearance of a figure 8, having upper and lower cavities. [Air bags] *Expansion means* are located within these cavities and are expanded to expand the collapsed tunnel liner section into its erected condition. During the expansion the liner section passes through an oversized condition before assuming its final erected condition. This ensures stability for the erected liner section. After erection, grout or other filler material is inserted between the liner section and the wall of the tunnel.

13 Claims, 13 Drawing Figures

COLLAPSIBLE TUNNEL LINER SECTION AND METHOD OF LINING A TUNNEL

Matter enclosed in heavy brackets [ ] appears in the original patent but forms no part of this reissue specification; matter printed in italics indicates the additions made by reissue.

This invention relates to a collapsible tunnel liner section and to a method of lining tunnels using collapsible liner sections.

Tunnels, particularly those having a medium diameter (5 to 12 feet) are commonly used to carry water and sewage, and also to carry services such as power and communication conduits. Such tunnels are currently normally constructed in one of two ways. In one of the common methods, a removable mold is constructed within an underground tunnel, and concrete is then injected between the exterior walls of the mold and the walls of the tunnel. After the concrete has set, the mold is disassembled and moved along to the head of the tunnel where it is again erected. The constant erection and disassembly of the mold is expensive and time consuming. Typical such removable molds are disclosed in U.S. Pat. Nos. 1,137,442; 1,320,199; 1,702,646; 1,716,125; and 1,734,773.

In the other assembly method which is commonly in use, segments of concrete tunnel liner sections are transported one at a time into the tunnel and are then assembled by a machine at the tunnel head, to form a complete concrete liner section. Grout is then injected between the exterior of the liner section and the tunnel and hardens to form a monolithic structure with the liner section. The disadvantage of this method is that assembly of the liner segments within the tunnel requires use of an expensive specially designed machine and requires stoppage of excavation for prolonged periods while a liner section is being assembled.

The present invention provides a hinged collapsible closed loop tunnel liner section which in collapsed form is small enough in cross section to be transported into the tunnel through the previously erected liner sections. When the collapsed tunnel liner section reaches the desired location, it is erected by [inflating one or more gas bags] *expanding the expansion means* located within the collapsed section. After the collapsible liner section has been erected and put into position, grout or other filler material is then inserted between the liner section and the tunnel wall. The same procedure may be used for vertical shafts (which however will usually be grouted), and the term "tunnel" as used herein is intended to include horizontal, sloping and vertical shafts.

Further objects and advantages of the invention will appear from the following [description] *description of preferred embodiments of the invention,* taken together with the accompanying drawings, in which.

Figure 1:
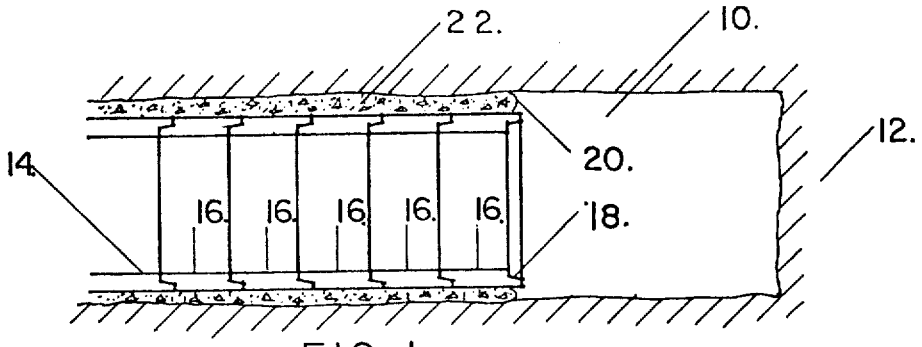
FIG. 1 is a sectional view showing a number of tunnel liner sections according to the invention in position in a tunnel.

Reference is first made to FIG. 1, which shows a tunnel 10 which has been cut through ground 12 by conventional means. The tunnel 10 is typically a medium diameter tunnel, for example 5 to 12 feet in diameter. A cylindrical tunnel liner 14 is positioned within the tunnel 10, the liner 14 consisting of a number of identical sections 16 constructed as will be described. The liner sections 16 may have keyed end portions 18 for alignment purposes. Grout 20 is injected in the space 22 between the exterior of the liner sections 16 and the ground 12 to form a monolithic tunnel structure.

Figure 2:
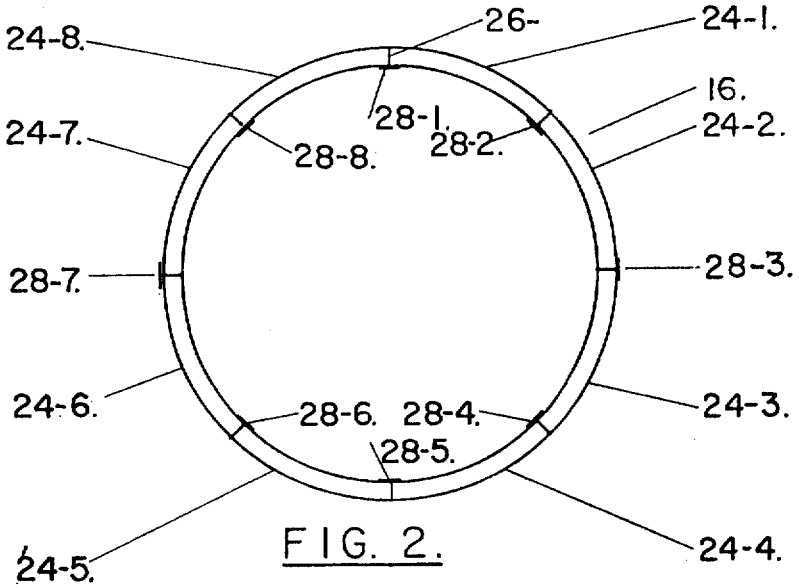
FIG. 2 is an end view showing a tunnel liner section of the invention in erected condition.
Figure 2A:
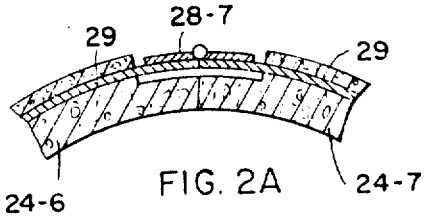
FIG. 2A is a sectional view through the joint between two segments.

As shown in FIG. 2, each tunnel liner section 16 is a closed loop (i.e. it is not open ended) and consists of eight identical arcuate concrete segments 24, numbered as 24-1 to 24-8 in the drawings. Each arcuate segment 24 extends over an arc of 45° and has a keyed end 26 for better engagement with its neighbouring segments. The segments 24 are connected together by flexible hinges 28-1 to 28-8, which may be elastomer or metal strip hinges glued or otherwise secured to the segments. All the hinges are located along the interior of the segments 24, except for the side hinges 28-3 and 28-7, which are located at the exterior of the segments. For example, as shown in FIG. 2A, the hinges may be welded or clamped to the circumferential reinforcing steel rods 29 used to reinforce the segments. The rods 29 are exposed at the ends of the segments for this purpose.

Figure 3:
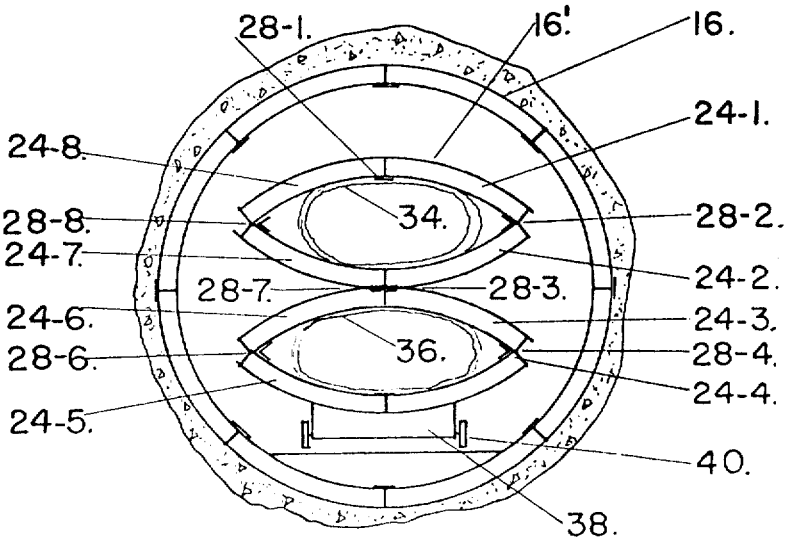
FIG. 3 is an end view of the tunnel liner section of FIG. 2 in collapsed condition prior to erection and located on a cart within an erected tunnel liner section.

The tunnel liner section 16 is shown in collapsed condition in FIG. 3. In its collapsed condition the tunnel liner section is indicated at 16', to differentiate it from the liner section in its erected condition. As shown in FIG. 3, the collapsed liner section 16' still forms a closed loop, i.e. a line traced along the respective segments in their numerical order is endless. However, the collapsed liner section 16' is now arranged in a compact stack having generally the form of a figure 8, in which segments 24-1, 24-2, 24-7 and 24-8 form the top portion of the "eight" and the segments 24-3, 24-4, 24-5 and 24-6 form the bottom portion. The top portion of the "eight" contains an upper cavity 30, and the lower portion contains a lower cavity 32. Two air bags 34, 36 are provided, one located within each cavity 30, 32.

Figure 4:
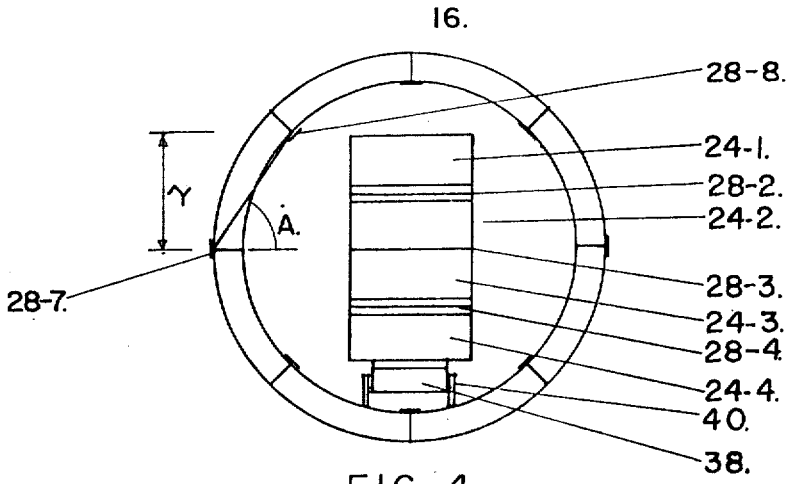
FIG. 4 is an end view similar to that of FIG. 3 and showing an alternative method of transporting the tunnel liner section of FIG. 2 through a tunnel.

It will be seen, as shown in FIG. 3, that in its collapsed condition the liner section 16′ has (as viewed from its end) a cross section in which the maximum dimension is less than the interior diameter of the erected liner section 16′. Therefore, the collapsed section 16′ may be transported axially through the partly finished tunnel on a cart 38 having wheels 40. Alternatively, provided that the length of the liner section 16′ is made short enough, it may be transported in the position shown in FIG. 4 which is rotated 90° in a horizontal plane from that shown in FIG. 3[)], and greater clearances may be provided in this manner, by suitably adjusting the length of the liner section 16′.

Figure 5:
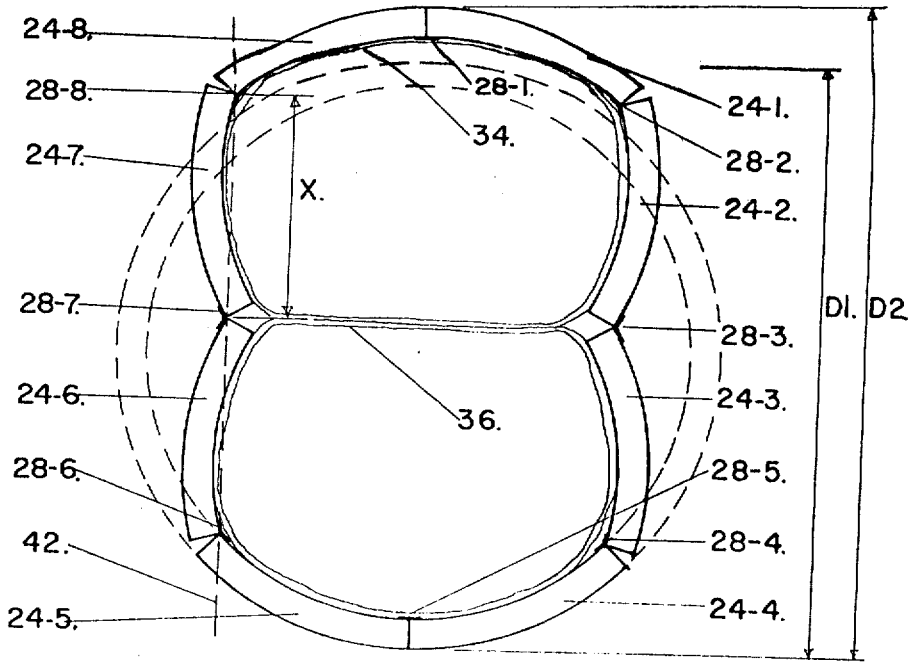
FIG. 5 is an end view showing the tunnel liner section of FIG. 2 in partially erected condition and showing the temporary oversize of the section.

When the collapsed liner section 16′ has been brought to the head of the tunnel, it is erected by inflating the air bags 34, 36 in conventional manner. In the embodiment shown in FIGS. 1 to 3, the air bags 34, 36 will normally be inflated together at the same time, to expand the liner section gradually as shown in FIG. 5.

It will be seen that the design of the liner section 16′ is such that during expansion, its maximum height increases beyond that of the finished liner section and then decreases to that of the finished liner section. This is because during the expansion procedure, the upper segments 24-1 and 24-8 move upwardly, away from the lower segments 24-4 and 24-5, and the exterior side hinges 28-2 and 28-7 move outwardly, away from each other. At the intermediate stage of erection shown in FIG. 5, the side segments 24-6 and 24-7 have reached a stage in which they are generally vertically aligned and in which the hinges 28-6, 28-7 and 28-8 are aligned in a straight vertical line, indicated by dotted line 42. At this point the maximum interior diameter D1 of the partly erected liner section 16′ exceeds the interior diameter D2 of the erected liner section 16. Then, as the hinges 28-7 and 28-2 continue to move outwardly, the upper segments 24-1 and 24-8 move back toward segments 24-4 and 24-5, and the liner section assumes its final circular form.

The temporary oversize condition of the liner section 16′ is essential in the embodiment illustrated, to provide a stable form when the liner section is in fully erected condition. The temporary oversize condition may be contrasted with a conventional collapsible interior tunnel mold which must not expand past its erected position during the erection procedure, since it could not then be removed. The extent of the temporary oversize of the liner section of the invention is modest and may be ascertained as follows. In the temporary oversize condition, the vertical distance between hinges 28-7 and 28-8 is simply the dimension x between the two hinges. In the final erected condition, the vertical distance y (FIG. 3) between hinges 28-7 and 28-8 is x sine A where A is the angle (FIG. 3) between the line joining hinges 28-7 and 28-8 and the horizontal (angle A in the FIGS. 1 to 3 embodiment will be slightly less than 45°). The difference in height between the oversize condition and the final erected condition is 2x(1-sine A) or about 0.6x if angle A is nearly 45°. This modest oversize will normally be accommodated by the oversized tunnel cross section which is normally provided to ensure adequate room for grout.

After each liner section 16′ has been erected, it is moved axially into contact with its neighbouring liner section 16 and aligned therewith. Grout 20 is then injected by conventional means between the newly installed liner section and the earth 12. The grout adheres to the exterior of the newly erected liner section 16 and forms with the section 16 a monolithic structure.

It will be seen that very little stress is imposed on the hinges 28. The hinges are used to hold the segments 24 of the liner section in the desired form in the collapsed condition of the liner section and also to guide the liner segments during the expansion. Once the liner section has been erected, it is essentially self supporting and the stress on the hinges 28 is minimal. Any residual stress is largely removed after the grout 20 has been injected and has hardened. By use of the method shown, complete closed loop liner sections can be brought through the tunnel into position and erected quickly, easily and inexpensively, without the need for costly and bulky assembly equipment located within the tunnel.

Figure 6:
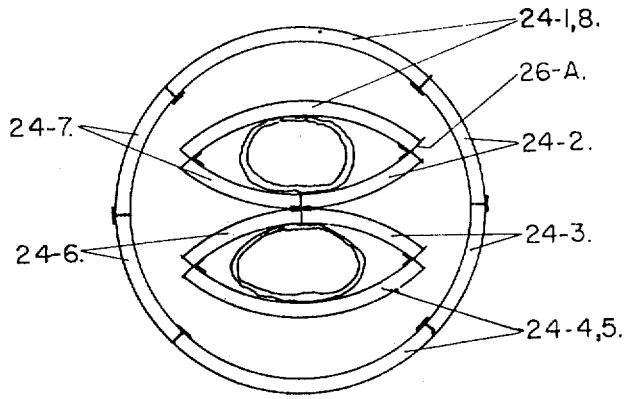
FIG. 6 is an end view showing a modified tunnel liner section in collapsed condition, located within an erected similar tunnel liner section.

If desired, and as shown in FIG. 6, the upper liner sections 24-1 and 24-8 may be joined as one monolithic arcuate concrete segment 24-1,8 extending over a 90° arc, and the bottom segments 24-4, 24-5 may be formed as a single similar arcuate segment 24-4,5. This method eliminates two sets of hinges but does require the production of two different kinds of segments. In the FIG. 6 embodiment, the ends 26a of the segments are simply formed as planar surfaces. In addition, air bag 34 has been replaced by two connected air bags 34a, 34b, and the same has been done for air bag 36. This improves the control over the shape of the air bags as they are erected. The air bags are secured together in conventional manner, e.g. by being sewn, or by heat bonding.

Figure 7:
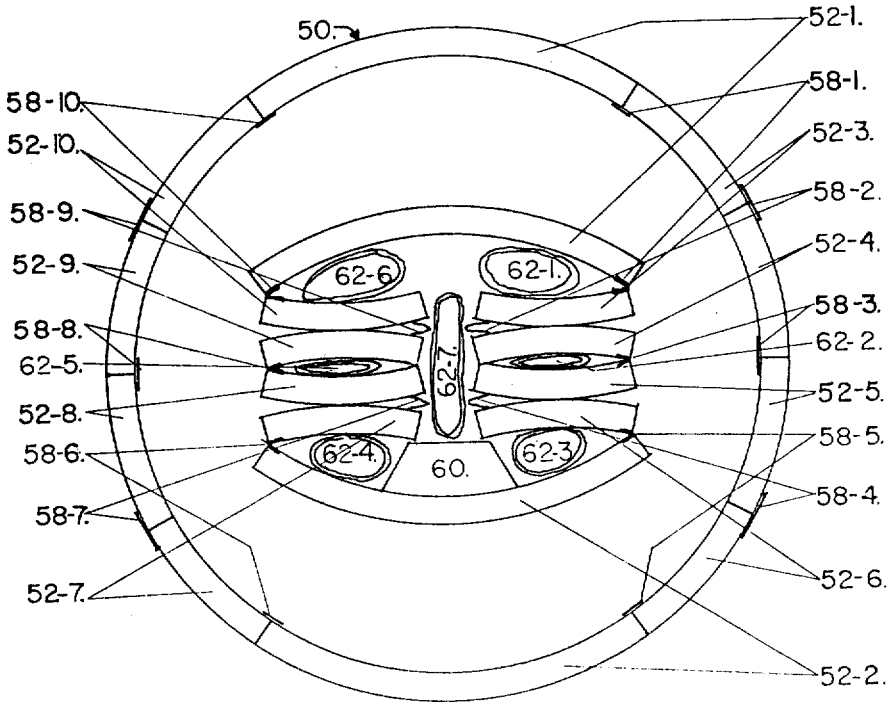
FIG. 7 is an end view showing a still further modified tunnel liner section in collapsed condition, located within an erected similar tunnel liner section.

Reference is next made to FIG. 7, which shows a further embodiment of the invention. As shown in FIG. 7, the liner section, indicated erected at 50 and collapsed at 50′, is formed from an upper arcuate concrete segment 52-1 extending over 60° of arc, an opposed lower arcuate concrete segment 52-2 also extending over 60° of arc, and eight intermediate concrete segments 52-3 to 52-10 each extending over 30° of arc. As shown, in collapsed condition the four segments 52-3 to 52-6 are arranged in a vertical sub-stack 54 at the right hand side of the collapsed liner section, and the four segments 52-7 to 52-10 are arranged in a vertical sub-stack 56 at the left hand side of the collapsed liner. Elastomeric hinges 58-1 to 58-10 are provided to hinge the sections together, the hinges being fastened to the concrete in conventional manner (e.g. by glue). To achieve the collapsed configuration shown, in which the sub-stacks 54, 56 have a rectangular form as viewed from their ends, hinges 58-2, 58-4, 58-7 and 58-9 are located on the exterior of the liner section 50 as erected, and the remaining hinges are located on the interior of the liner section 50. It will be seen that hinge 58-2, for example, is fastened to segments 52-3 and 52-4 at contact points 58-21, 58-22 located on the exterior surfaces of the segments. The length between these contact points along the hinge is equal to the arc length along the segments between the contact points, so the hinge will simply extend along the outside surfaces of the segments when the section is erected.

In the FIG. 7 embodiment, a temporary block on support 60 is provided, located on the concave surface of the bottom segments 52-2, to support the two sub-stacks 54, 56. Seven air bags 62-1 to 62-7 are provided for erection, located within the cavities formed by opposed concave surfaces of the segments, and all connected to each other for better control of their shape during erection. The air bags may be inflated in an appropriate sequence to achieve stable erection of the liner section 50′. For example seven hoses and a distributor (not shown) may be used to direct air to the desired air bags. It will be seen that during erection of the FIG. 7 embodiment, the air bags should be slightly overinflated and then as they are collapsed, the section will settle back to its final erected condition. The same system of connecting multiple air bags together may be used in the other embodiments described and has the added advantage of reducing the likelihood of chipping the edges of the segments.

Figure 8:
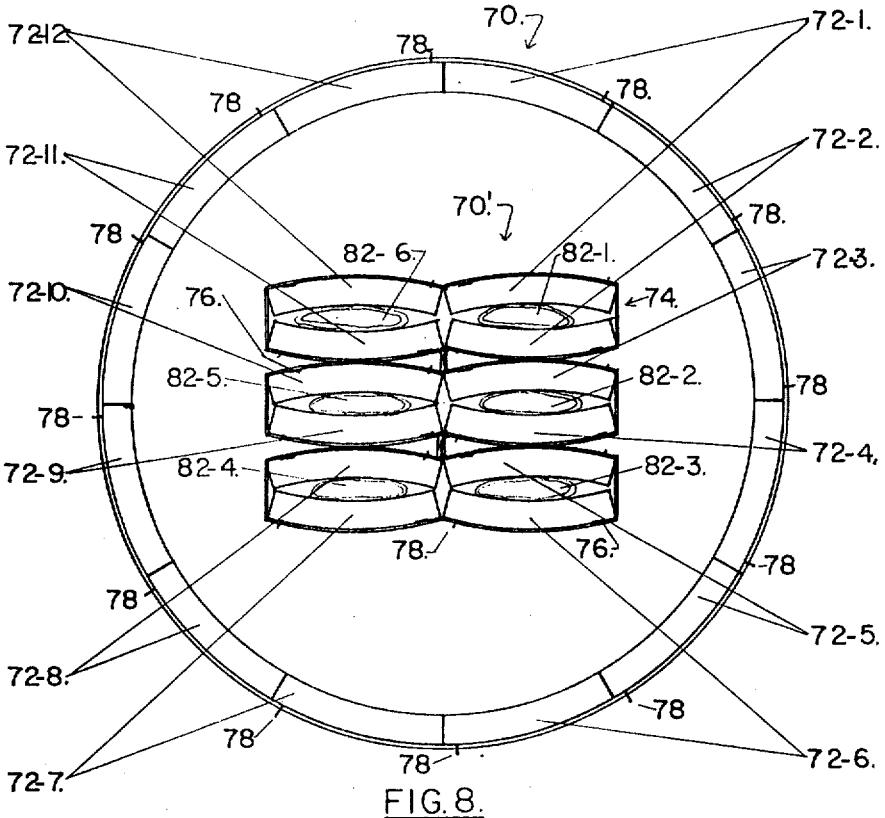
FIG. 8 is an end view showing a still further modified tunnel liner section in collapsed condition, located within an erected similar tunnel liner section.
Figure 9:
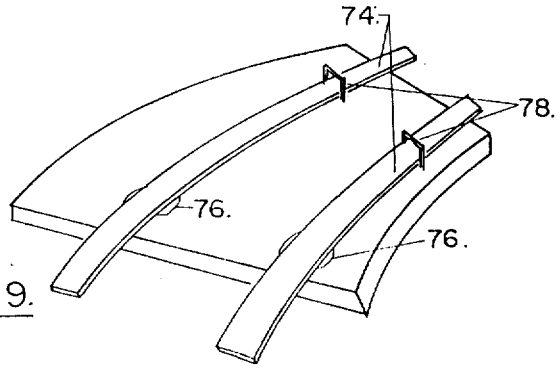
FIG. 9 is a perspective view showing elastic strap detail for the tunnel liner section of FIG. 8.

Reference is next made to FIG. 8, which shows a collapsed liner section 70' located within a corresponding erected liner section 70. As shown, the liner section 70, 70' resembles the liner section 50, 50' except that the segments [51-1] *52-1* and 52-2 have each been divided into two equal parts and folded. Specifically, liner 70, 70' includes twelve arcuate concrete segments 72-1 to 72-12 each extending over 30° of arc, and arranged in two sub-stacks 74, 76 of six segments each. Each substack is generally rectangular in form as viewed from its end, resulting in very substantial clearances at the sides and top and bottom of the collapsed liner 70'. In the FIG. 8 embodiment the hinge means used may consist of two or more elastic straps best shown at 74 in FIG. 9. Each strap 74 has a number of relatively short portions 76 which are secured one to each concrete segment by a suitable adhesive. The remainder of each strap 74 is not bonded to the segments since this would inhibit stretching of the straps 74. However, strap guides may be provided, consisting of wire loops 78, one set into the exterior of each segment.

In the collapsed condition of the liner, the elastic straps 74 follow a tortuous path as indicated in FIG. 8, the points of adherence 76 preferably being located near one hinge point of each segment. Six air bags 82-1 to 82-6 are located within the cavities formed between the opposing concave surfaces of the segments. When the air bags are inflated, the collapsed liner section 70' expands through an intermediate oversized condition of the kind previously described, to the final erected condition shown at 70. The straps 74 may also be used in the embodiments previously described. If desired, the air bags 82-1 to 82-6 may be connected to each other or to a central air bag like air bag 62-3 shown in the FIG. 7 embodiment.

Figure 10:
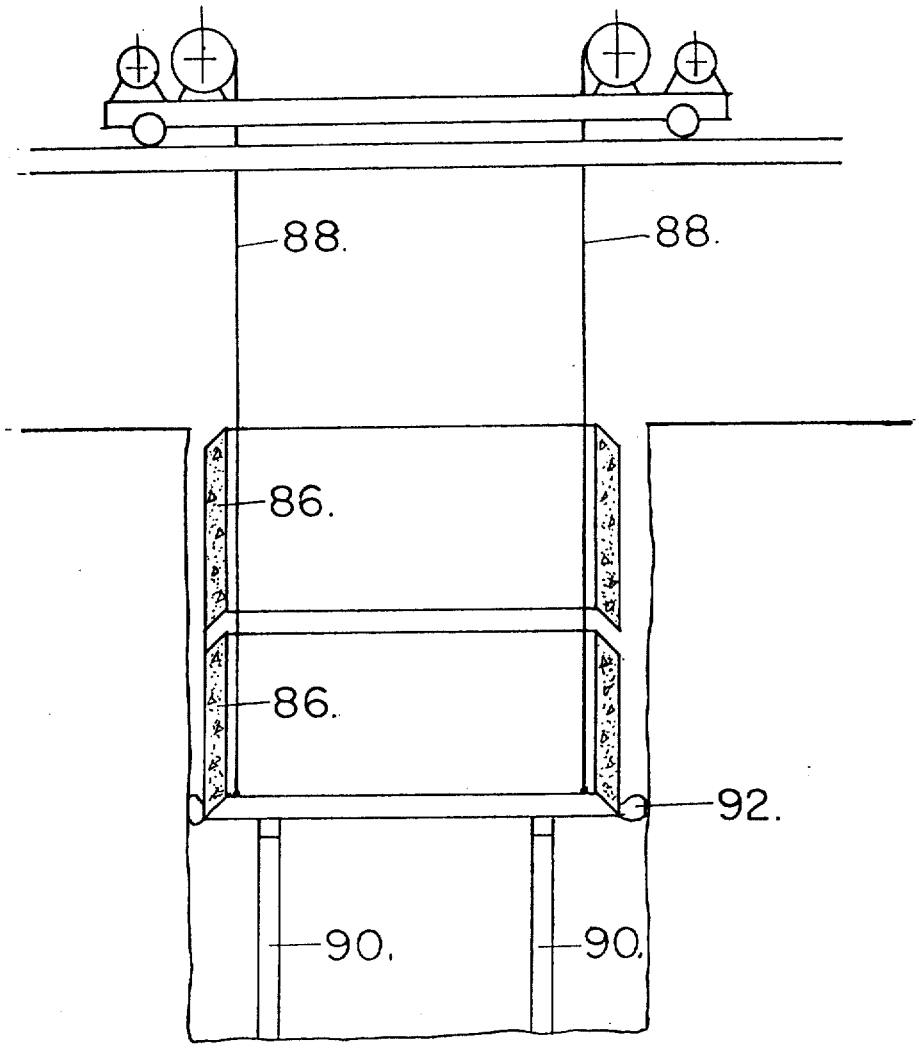
FIG. 10 is a sectional view showing the tunnel liner sections of the invention being assembled within a mine shaft.

When the collapsible liner sections of the invention are used in tunnel shafts, the procedure is essentially the same as that previously described, except, as shown in FIG. 10, each liner section 86 (which may be any of the forms described) is lowered in collapsed condition on cables 88 to the desired position, where it is supported on temporary shoring 90. While thus supported, the liner section 86 is then expanded by its air bags (not shown) and is then grouted. Gaps 91 may be left between adjacent sections to facilitate grouting. A plug 92 is installed around the bottom exterior of the expanded liner section 86 (after the expansion has been completed) to retain the grouting.

Figure 11:
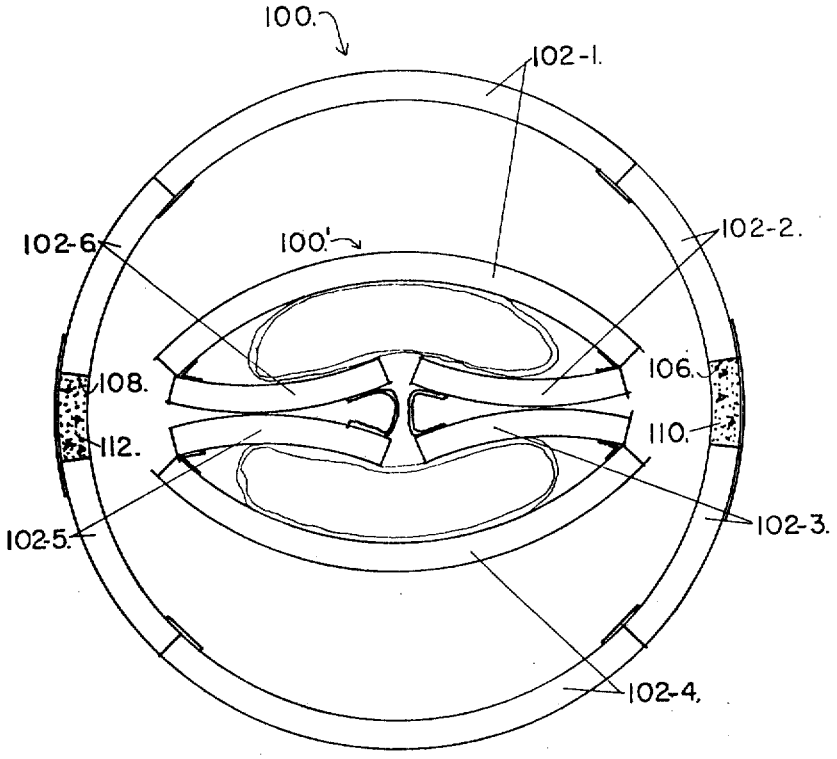
FIG. 11 is an end view showing a still further modified tunnel liner section in collapsed condition, located within an erected similar tunnel liner section.

In some cases it may be desirable that the liner as it is being erected not expand to an oversized condition even temporarily. In this event, the liner section 100 shown in FIG. 11 (and shown at 100' in collapsed condition) may be used. In the liner section, six arcuate segments 102-1 to 102-6 are used. The upper and lower segments 102-1 and 102-4 are each 60° in arcuate length. However, the four intermediate segments 102-2, 102-3, 102-5, 102-6 are of somewhat lesser than 30° in arcuate length. The ends of adjacent intermediate segments 102-2 and 102-3, 102-5 and 102-6 are connected together by wide elongated flexible elastomer hinges 104-1, 104-2, glued to the segments at points 104-1a, 104-1b, 104-2a, 104-2b. Therefore, when the liner section 100' is erected, longitudinal gaps 106, 108 occur between the ends of segments 102-2, 102-3 and 102-5, 102-6. The gaps 106, 108 may then be filled with concrete plugs 110, 112 which may be cast in place or may be precast and then inserted. Since the liner sections are relatively short, the precast plugs may be inserted from the end.

Figure 12:
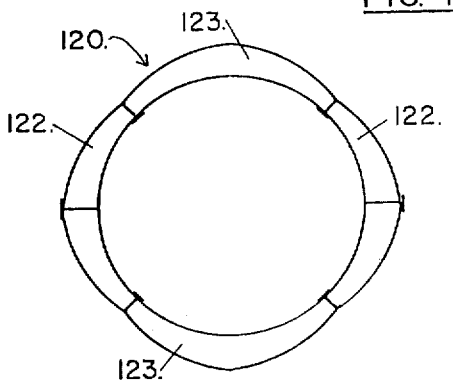
FIG. 12 is an end view showing yet another modified tunnel liner section, in erected condition.

Although the erected tunnel liner sections have been shown as having a circular section, it will be realized that they can have a different erected cross section, for example elliptical or horse-shoe shaped. In addition, while the segments have been shown as annular, they can be thickened at locations of increased stress, as shown for example in FIG. 12. In the FIG. 12 embodiment the interior of the liner section 120 remains of circular cross section, but the exterior has been thickened or arched at the top, bottom and sides as indicated at 122, to provide greater strength. The segments need not be symmetrical or equal in length but may be varied, and the hinging arrangement may be varied as required (for example in the FIGS. 2 and 3 embodiment, hinges 28-1 and 28-5 may be on the exterior of the segments to allow a slight "peaking" at the top and bottom of the section during erection).

If desired, instead of concrete grouting, other means may be used to fill the gap between the exterior of the liner sections and the tunnel wall. For example, urethane foam may be used, and this will also insulate the liner. Alternatively, where the tunnel is accurately bored (e.g. by a drilling machine in hard ground), precast bars or blocks may be inserted between the exterior of the liner sections and the tunnel wall. Any gaps between the bars or blocks may be left or may be grouted or filled with foam, depending on the requirements of the tunnel in question.

What I claim as my invention is:

1. A collapsible [concrete] tunnel liner section comprising:

(a) at least six arcuate [concrete] segments forming, when erected, a closed loop tunnel liner section of predetermined inner diameter, (b) hinge means hingedly connecting said segments together for movement from a collapsed condition in which said segments are arranged in a compact closed loop stack having an external cross section less in its maximum dimension than said predetermined diameter, through an intermediate position in which said segments are partly erected and have an interior cross section having a maximum dimension greater than said predetermined diameter, to an erected condition in which said segments form said closed loop tunnel liner section, and (c) [expandable air bag] *expansion* means within said stack for expanding and thereby expanding said stack from said collapsed condition through said intermediate condition to said erected condition.

2. A tunnel liner section according to claim 1 and comprising two opposed segments each extending through 90° of arc, and four intermediate segments each extending through 45° of arc.

3. A tunnel liner section according to claim 1 and comprising eight segments each of equal arcuate length and each thereby extending over 45° of arc.

4. A tunnel liner section according to claim 1, wherein said stack has substantially the form of a figure 8 and thereby having a pair of spaced cavities, and said

[air bag] *expansion* means comprises at least two air bags, one in each said cavity.

5. A tunnel liner section according to claim 1 and comprising two opposed segments each extending over 60° of arc, and eight intermediate segments each extending over 30° of arc, said intermediate segments forming, when said liner section is in collapsed condition, two sub-stacks of four segments each, each sub-stack being located at one side of said stack and each sub-stack being generally rectangular in form as viewed from its end.

6. A tunnel liner section according to claim 1 and comprising twelve segments each extending over 30° of arc, said segments being arranged, when said liner section is in collapsed condition, in two sub-stacks of six segments each, one sub-stack at each side of said stack and each sub-stack being generally rectangular in form as viewed from its end.

7. A tunnel liner section according to claim 1, wherein said hinge means comprises a set of flexible hinges adhered to said segments.

8. A tunnel liner section according to claim 1, wherein said hinge means comprises a closed loop elastic strap extending over each segment and being adhered to a portion of each segment.

9. A tunnel liner section according to claim 1, wherein each segment includes circumferential reinforcing rods therein, said hinge means comprising a plurality of discrete hinges, said hinges being secured to said reinforcing rods.

10. A tunnel liner section according to claim 1, wherein said air bag means comprises a plurality of air bags connected together.

11. A collapsible concrete tunnel liner section of predetermined inner diameter comprising (a) at least six arcuate [concrete] segments, (b) hinge means hingedly connecting said segments together for movement from a collapsed condition in which said segments are arranged in a closed loop compact stack having an external cross section less in its maximum dimension than said predetermined diameter, to an erected condition in which said segments form said closed loop tunnel liner section but with a first longitudinal space between one pair of said segments and a second longitudinal space between a second pair of said segments, (c) [expandable air bag] *expansion* means within said stack for expanding and thereby expanding said stack from said collapsed condition to said erected condition, (d) and filler means for filling said spaces and thereby stabilizing said section.

*12. A tunnel liner section according to claim 1, wherein said expansion means comprises a plurality of fluid bags connected together.*

*13. A tunnel liner section according to claim 1, wherein said stack has substantially the form of a figure 8 and thereby having a pair of spaced cavities.*

* * * * *